United States Patent [19]
Likitcheva

[11] Patent Number: 5,511,384
[45] Date of Patent: Apr. 30, 1996

[54] METHOD AND APPARATUS FOR HEAT ACCUMULATION FROM REFRIGERATION MACHINE

[76] Inventor: Pichit Likitcheva, 28/1 Soi Chuasuwan, Udomsuk Praves, Bangkok 10260, THX

[21] Appl. No.: 371,355

[22] Filed: Jan. 11, 1995

[30] Foreign Application Priority Data

Jan. 13, 1994 [GB] United Kingdom ............ 9400589

[51] Int. Cl.⁶ .................................................. F25D 3/00
[52] U.S. Cl. ........................... 62/59; 62/430; 62/439; 165/154
[58] Field of Search ................... 62/59, 185, 356, 62/430, 431, 432, 436, 439; 165/154, 168, 169

[56] References Cited

U.S. PATENT DOCUMENTS

| 2,667,045 | 1/1954 | McCarthy | 62/439 |
| 5,465,591 | 11/1995 | Cur et al. | 62/439 |

FOREIGN PATENT DOCUMENTS

| 0606687 | 2/1945 | United Kingdom. |
| 0669589 | 4/1952 | United Kingdom. |
| 1023981 | 3/1966 | United Kingdom. |
| 1194747 | 6/1970 | United Kingdom. |
| 2016288 | 3/1979 | United Kingdom. |
| 2083604 | 9/1980 | United Kingdom. |

*Primary Examiner*—John M. Sollecito
*Attorney, Agent, or Firm*—Wood, Herron & Evans

[57] ABSTRACT

The losing of a huge amount of energy is overcome by a method and an apparatus for heat accumulation from refrigeration machine of the present invention. The apparatus comprises of two sections. The first section is the smalled diameter heat carrying fluid tube inserted inside the larger diameter refrigerant tube of the condenser, the second section is the expanded cross sectional area refrigerant tube enclosed inside the heat carrying fluid tube. By replacing the conventional refrigerant tube of the condenser by the first section of this invention, by connecting the second section of this invention between the compressor and the condenser of the conventional refrigeration machine, and by feeding the heat carrying fluid into the two heat carrying fluid tubes connected in series in the direction opposite to the direction of the refrigerant flowing inside the refrigerant tube of the refrigeration machine, the heat carrying fluid with its temperature high enough for an industrial use can be obtained.

4 Claims, 4 Drawing Sheets

METHOD AND APPARATUS FOR HEAT ACCUMULATION FROM REFRIGERATION MACHINE

FIELD OF THE INVENTION

The present invention relates to a method and an apparatus for the accumulation of heat from a heat generating machine and, more particularly, to a method and an apparatus for heat accumulation from refrigeration machine.

BACKGROUND OF THE INVENTION

In general, conventional refrigeration machines such as refrigerators, air conditioners or the likes are built to decrease air temperature for some different useful purposes. To decrease air temperature, an amount of energy in the form of heat must be removed from the air volume. And to remove heat energy from such air volume, an appropriate amount of energy at least equal to that of removed energy must be applied to the refrigeration machine. This amount of energy is the amount that we have to spend money for it.

As described above, the amount of money we have to pay to receive cooled air is directly proportional to the amount of heat energy removed from the air volume. This amount of energy, which is in some case a huge amount of energy, is wastefully blown away by an electric fan of a typical conventional refrigeration machine to an atmosphere external to the cooled air volume without utilizing this useful amount of energy. This is not only the losing of a huge amount of energy, which is the losing of a large amount of money, but also the causing of an unpleasant atmosphere by the increasing of surrounding air temperature to the worker nearby.

Thai Patent Application No. 000342 filed on Jan. 28, 1982 by Aircon Incorporated of Manila Philippines under the invention title "AIR CONDITIONER WATER HEATER" has disclosed the invention of an air conditioner water heater by constructing a separate water tube system located in front of the refrigerant tube of the condenser of an air conditioner as shown in FIG. 1. The refrigerant tube of the condenser of an air conditioner transfers heat to the water flowing in this water tube system by means of common metal fins. By this method, hot water flowing out of the water tube system posseses a relatively low temperature and it is not appropriate for an industrial use. In addition, a relatively large amount of heat energy generated by this air conditioner still be wastefully lost to the surrounding atmosphere.

SUMMARY OF THE INVENTION

It is an object of the present invention to provide the method and apparatus for heat accumulation from refrigeration machine giving heat with its temperature high enough for industrial use, without any usage of an energy in additional to that of being used for producing cool air by the refrigeration machine.

To achieve the above object, according to the present invention, the apparatus for heat accumulation from refrigeration machine comprises of two main sections; the first section apparatus for heat accumulation from refrigeration machine and the second section apparatus for heat accumulation from refrigeration machine. The purpose of the first section apparatus for heat accumulation from refrigeration machine is to perform the first step of heat accumulation from refrigeration machine by the heat carrying fluid used to accumulate heat, This is to increase the temperature of the low temperature heat carrying fluid used to accumulate heat up to the highest possible temperature before being fed into the second section apparatus for heat accumulation from refrigeration machine for the best performance of the second section apparatus for heat accumulation from refrigeration machine. The purpose of the second section apparatus for heat accumulation from refrigeration machine is to perform the second step of heat accumulation from refrigeration machine by the heat carrying fluid used to accumulate heat being fed from the first section apparatus for heat accumulation from refrigeration machine. This is to make the heat accumulation more complete and to obtain the heat carrying fluid used to accumulate heat with its temperature high enough for an industrial use.

The first section apparatus for heat accumulation from refrigeration machine is the apparatus to accumulate heat from the hot vapour of the refrigerant. The heat accumulation beginning from the location of lower temperature refrigerant at the leaving region of the condenser to the location of relatively high temperature refrigerant at the entering region of the condenser. This is done by the construction of smaller diameter tube for the heat carrying fluid used to accumulate heat inside the larger diameter refrigerant tube of the condenser. The smaller diameter tube and the larger diameter tube formulate the so called "DOUBLE TUBE" in such a manner that the annular cross sectional area of the space between the smaller diameter tube and the larger diameter tube is equal to the cross sectional area of the refrigerant tube in the original system without the smaller tube for the heat carrying fluid used to accumulate heat inside.

The method for heat accumulation from refrigeration machine by the first section apparatus for heat accumulation From refrigeration machine is made by feeding the lower temperature heat carrying fluid used to accumulate heat into the smaller diameter tube for the heat carrying fluid used to accumulate heat in the direction opposite to the direction of the refrigerant flowing in the space between the smaller diameter tube for the heat carrying fluid used to accumulate heat and the larger diameter refrigerant tube.

The second section apparatus for heat accumulation from refrigeration machine is the apparatus to accumulate heat from the hot vapour of the refrigerant. The heat accumulation beginning from the location of relatively high temperature refrigerant at the entering region of the condenser to the location of very high temperature refrigerant at the leaving region of the compressor. This is done by the construction of refrigerant tube increased in its cross sectional area and/or its external surface inside the heat accumulating tube which is built to enclose the refrigerant tube. One inlet and one outlet are built to allow the heat carrying fluid used to accumulate heat flows in and out of the space between the enclosing heat accumulating tube and the enclosed refrigerant tube.

The method for heat accumulation from refrigeration machine by the second section apparatus for heat accumulation from refrigeration machine is made by feeding the heat carrying fluid used to accumulate heat flowing from the first section apparatus for heat accumulation from refrigeration machine into the inlet of the space between the refrigerant tube increased in its cross sectional area and/or its external surface and the heat accumulating tube of the second section apparatus for heat accumulation from refrigeration machine in the direction opposite to the direction of the refrigerant flowing in the refrigerant tube increased in its cross sectional area and/or its external surface.

DESCRIPTION OF THE PREFERRED EMBODIMENTS

Preferred embodiments of the present invention will be described below with reference to the accompanying drawings.

Figure 1:
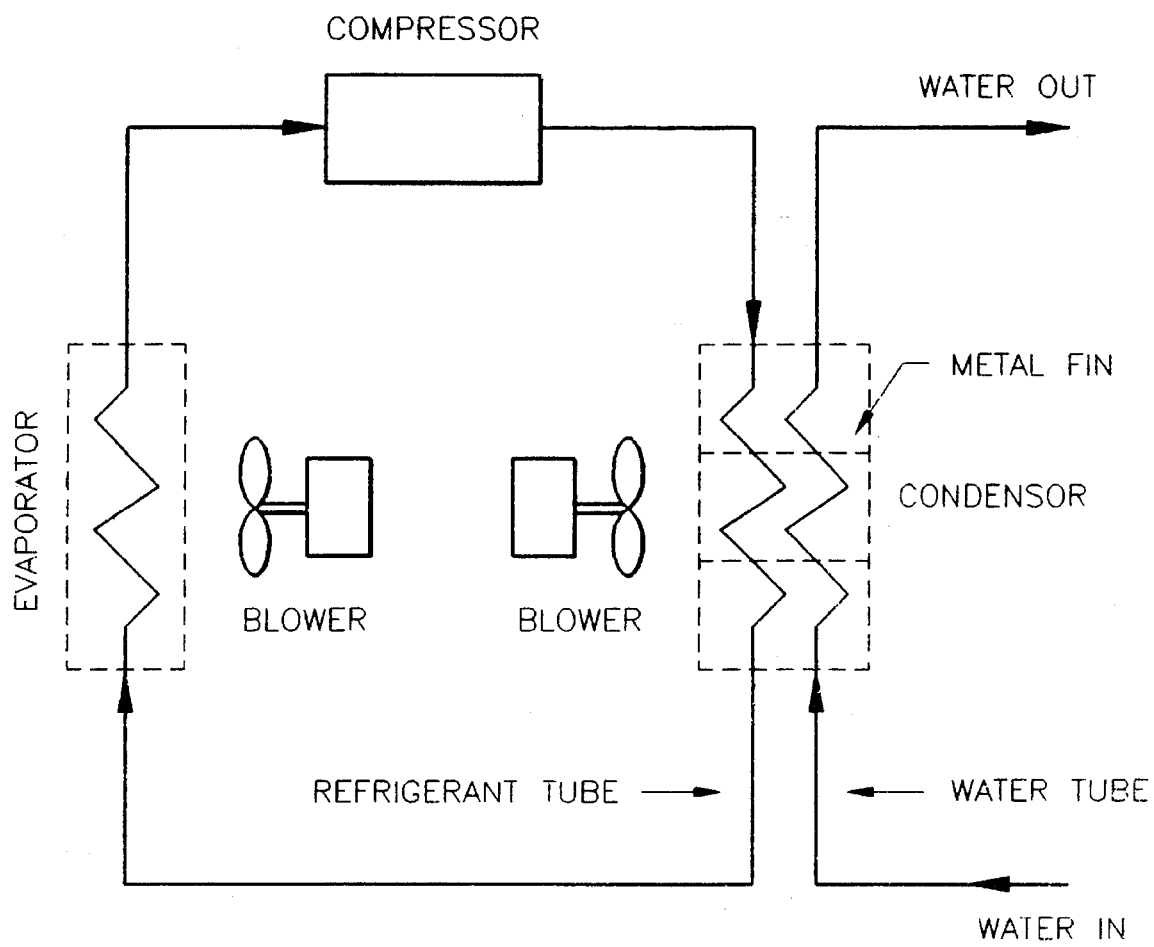
FIG. 1 is a schematic diagram illustrating a separate water tube system located in front of refrigerant tube of the condenser of the air conditioner in the air conditioner heater of the prior art.
Figure 2:
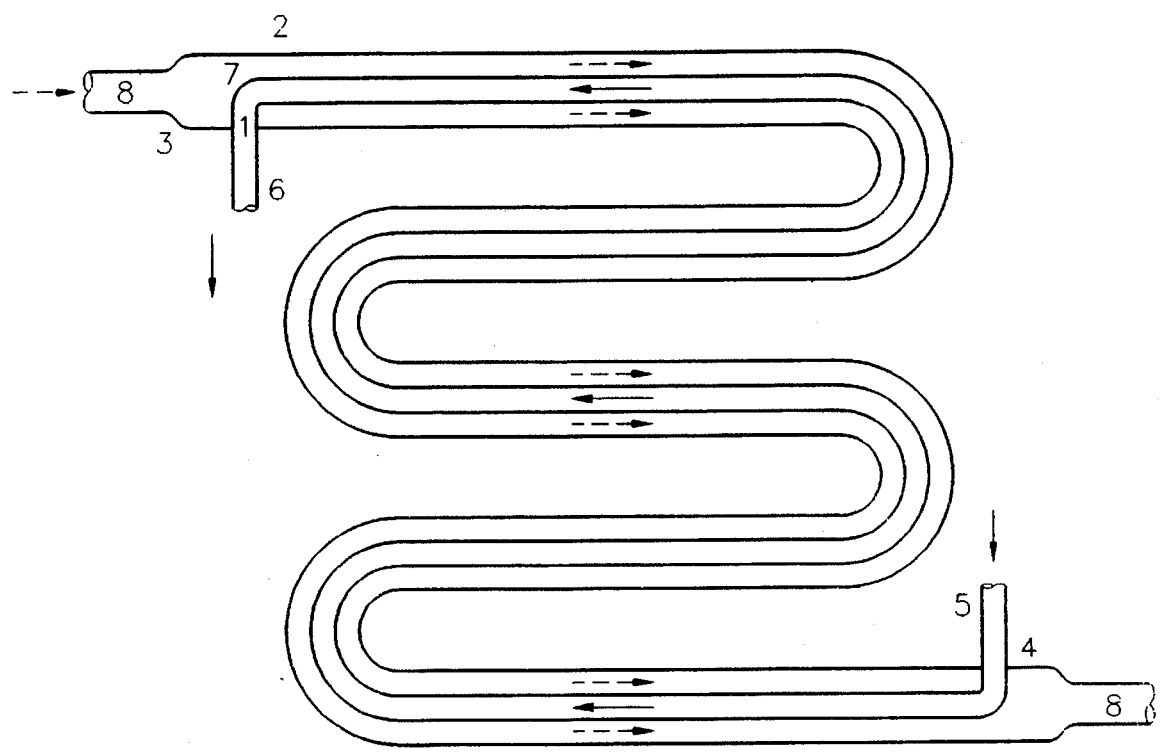
FIG. 2 is a schematic diagram illustrating a first section apparatus for heat accumulation from refrigeration machine in accordance with an embodiment of the present invention.

FIG. 2 Illustrates the First section apparatus for heat accumulation from refrigeration machine in accordance with the preferred embodiment of the present invention. In this FIGURE, the preliminary heat accumulation tube 1 is inserted inside the refrigerant tube of the condenser 2 which is larger in diameter. One end of the preliminary heat accumulation tube 1 emerges outside the refrigerant tube of the condenser 2 at the entering region of the refrigerant tube into the condenser 3. The other end of the preliminary heat accumulation tube 1 emerges outside the refrigerant tube of the condenser 2 at the leaving region of the refrigerant tube from the condenser 4.

The feeding tube for the preliminary heat accumulation tube 5 is at one end connected to one end of the preliminary heat accumulation tube 1 emerging from the leaving region of the refrigerant tube from the condenser 4 and at another end left open to be used as an inlet to feed lower temperature heat carrying fluid used to accumulate heat into the preliminary heat accumulation tube 1.

The discharge tube for the preliminary heat accumulation tube 6 is at one end connected to one end of the preliminary heat accumulation tube 1 emerging from the entering region of the refrigerant tube into the condenser 3 and at another end left open to be used as an outlet to discharge higher temperature heat carrying fluid used to accumulate heat out of the preliminary heat accumulation tube 1.

FIG. 2 Also illustrates the formulation of the so called "double tube" of the first section apparatus in such a manner that the annular cross sectional area of the space between the smaller diameter tube and the larger diameter tube 7 is essentially equal to the cross section area of the refrigerant tube in the original system of the refrigeration machine 8.

The heat carrying fluid used to accumulate heat, such as water, can be fed into the preliminary heat accumulation tube 1 along the direction of the solid-line arrows illustrated in FIG. 2. On the other hand, the refrigerant can be fed into the refrigerant tube of the condenser 2 along the direction of the dashed-line arrows also illustrated in FIG. 2 which is opposite to the direction of heat carrying fluid flowing in the preliminary heat accumulation tube 1.

Figure 3:
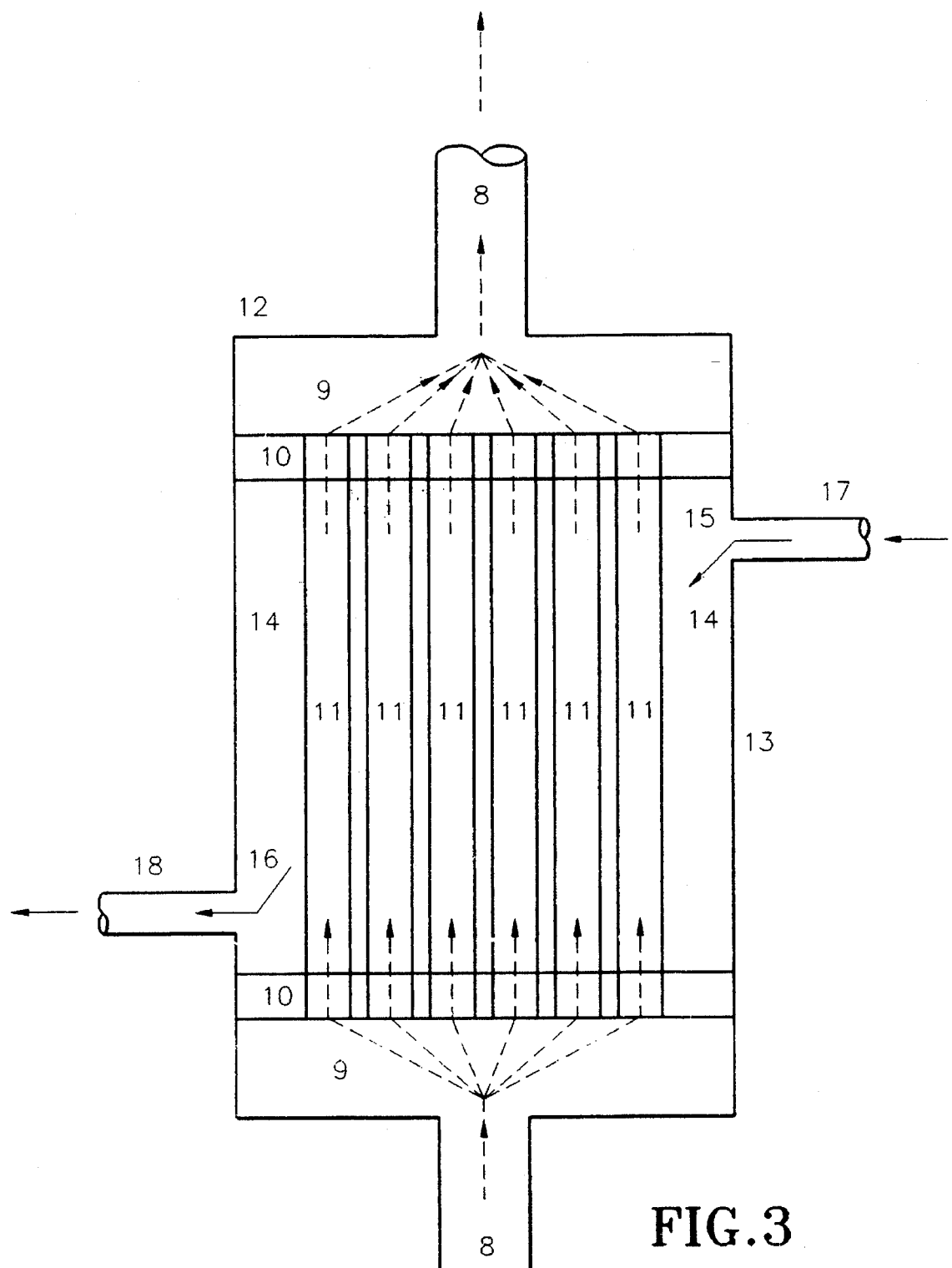
FIG. 3 is a schematic diagram illustrating a second section apparatus for heat accumulation from refrigeration machine in accordance with an embodiment of the present invention.

FIG. 3 Illustrates the second section apparatus for heat accumulation from refrigeration machine in accordance with the preferred embodiment of the present invention.

In FIG. 3, the refrigerant tube in the original system of the refrigeration machine 8 is increased in its cross sectional area to be two enclosed spaces 9, 9 which are enclosed two metal plates 10, 10. These two enclosed spaces 9, 9 are connected to each other by a plurality of small hollow tubes 11 in such a manner that the refrigerant can flow from one enclosed space to the other enclosed space through these small hollow tubes 11. These small hollow tubes 11 are rearranged such that there are small gaps among them. This is done to increase the total internal and external wall surfaces of the refrigerant tube. This portion of the apparatus 9, 10, 11 is called hereinafter "the expanded refrigerant tube 12".

The heat accumulation tube 13 is constructed to enclose the expanded refrigerant tube and to have a space 14 between its internal wall surface and the external wall surface of the outmost small hollow tubes of the expanded refrigerant tube 12. The heat accumulation tube 13 is also constructed to have an inlet 15 and an outlet 16 for the space 14.

The feeding tube for heat accumulation tube 17 is at one end connected to the inlet, 15 of the heat accumulation tube 13 and at another end left open to be used as an inlet to feed lower temperature heat carrying fluid used to accumulate heat into the heat accumulation tube 13.

The discharge tube for heat accumulation tube 18 is at one end connected to the outlet 16 of the heat accumulation tube 13 and at another end left open to be used as an outlet to discharge higher temperature heat carrying fluid used to accumulate heat out of the heat accumulation tube 13.

The heat carrying fluid used to accumulate heat, such as water, can be fed into the heat accumulation tube 13 along the direction of the solid-line arrows illustrated in FIG. 3. On the other hand, the refrigerant can be fed into the expanded refrigerant tube 12 along the direction of the dashed-line arrows also illustrated in FIG. 3 which is opposite to the direction of heat carrying fluid flowing in the heat accumulation tube 13.

Figure 4:
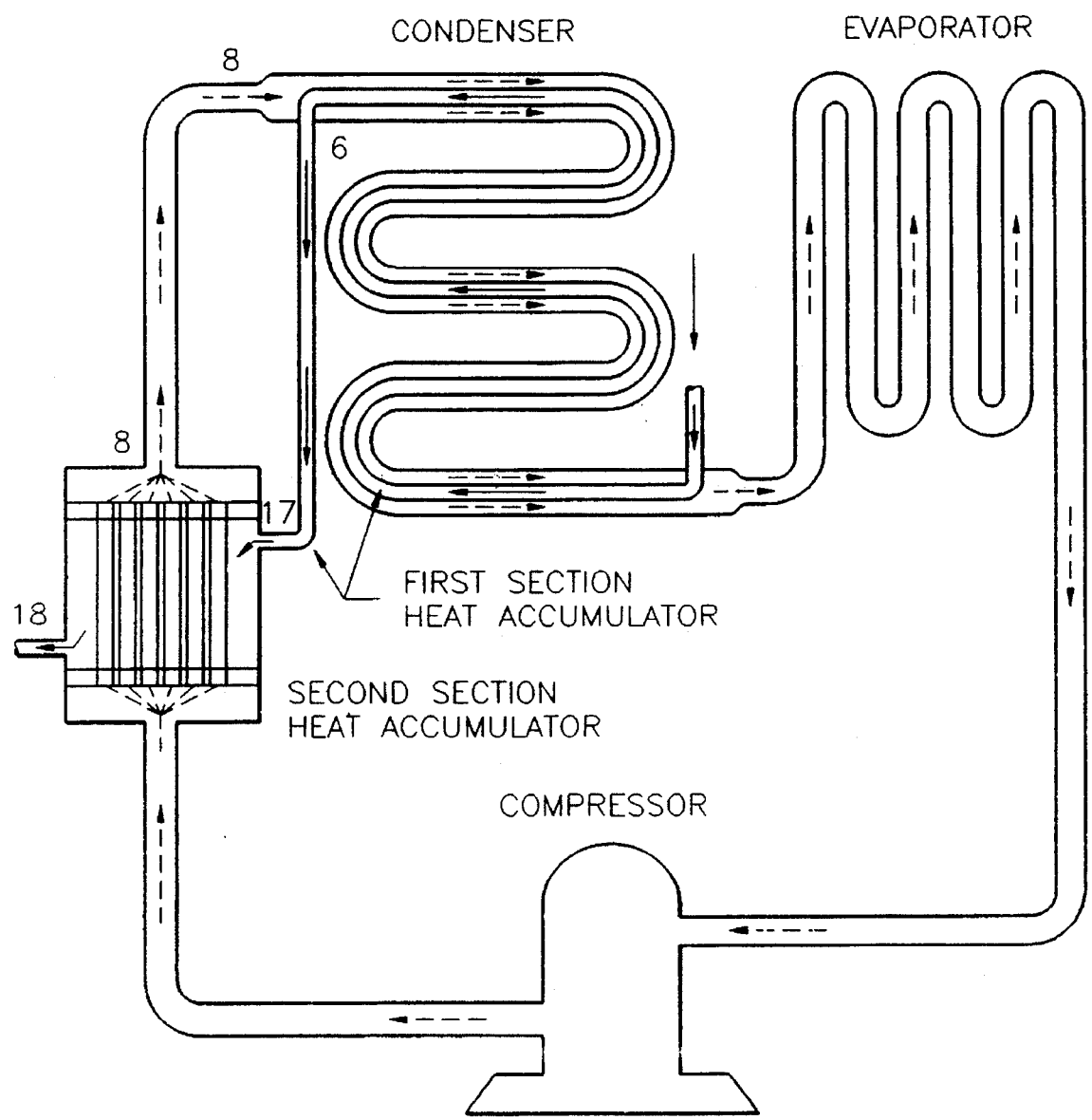
FIG. 4 is a schematic diagram illustrating the application of the first section apparatus and the second apparatus for heat accumulation from refrigeration machine in the refrigeration machine circuit in accordance with an embodiment of the present invention.

FIG. 4 Illustrates the heat accumulation and refrigeration system which is the application of the first section apparatus and the second section apparatus for heat accumulation from refrigeration machine in the refrigeration machine in accordance with the preferred embodiment of the present invention. The discharge tube for preliminary heat accumulation tube 6 of the first section apparatus for heat accumulation from refrigeration machine is connected to the feeding tube for heat accumulation tube 17 of the second section for heat accumulation from refrigeration machine. Similarly, the refrigerant tube in the original system of the refrigeration machine 8 at the entering region of the first section apparatus for heat accumulation from refrigeration machine is connected to the refrigerant tube in the original system of the refrigeration machine 8 at the leaving region of the second section apparatus for heat accumulation from refrigeration machine.

The system as shown in FIG. 4 can be called "the heat accumulation and refrigeration system" due to its capability in performing as a heat accumulator and as a refrigeration machine simultaneously. It is capable of providing cooled air through its evaporator and is also capable of providing heated fluid through its first section apparatus and second apparatus for heat accumulation from refrigeration machine as described above.

To obtain the heated fluid, the refrigeration circuit is first started so that the compressor compresses the refrigerant along the direction of the dashed-line arrows as shown in FIG. 4 and generates the hot vapour refrigerant along the refrigerant tube, and the lower temperature heat carrying fluid used to accumulate heat such as water is then fed into the feeding tube for preliminary accumulation tube 5 of the first section apparatus for heat accumulation from refrigeration machine as shown also in FIG. 4. This lower temperature heat carrying fluid used to accumulate heat is forced to flow along the direction of solid-line arrows as shown in FIG. 4 which is opposite to the direction of hot vapour refrigerant flowing inside the refrigerant tube to form the so called "contraflow configuration" for the system from the feeding tube for preliminary accumulation tube 5 of the first section apparatus for heat accumulation from refrigeration machine to the discharge tube for heat accumulation tube 18 of the second section apparatus for heat accumulation from refrigeration machine.

By the above described contraflow configuration, the lower temperature heat carrying fluid used to accumulate heat starts to accumulate heat smoothly from the lowest temperature hot vapour refrigerant which is flowing inside the refrigerant tube, at the leaving region of the condenser until it reaches the essentially highest temperature hot vapour refrigerant at leaving region of the compressor where the heat accumulation process is completed.

The lower temperature heat carrying fluid used to accumulate heat fed into the feeding tube for preliminary accumulation tube 5 of the first section apparatus for heat accumulation from refrigeration machine is increased in its temperature gradually during its accumulation of heat from the hot vapour refrigerant flowing inside the refrigerant tube and becomes the higher temperature heat carrying fluid discharged out of the discharge tube for heat accumulation tube 18. The increasing in temperature of the lower temperature heat carrying fluid used to accumulate heat can be controlled by the flowing rate of the heat carrying fluid used to accumulate heat inside the heat carrying fluid tube. For example, the lower temperature water or 30° C. was used as the heat carrying fluid and was fed into the heat accumulation and refrigeration system in accordance with the preferred embodiment of the present invention as shown in FIG. 4, using a 1200 BTU air conditioner as an original refrigeration machine, with the flowing rate of 250 C.C./3 min, the higher temperature water of approximately 70° C. can be obtained. This higher temperature water of 70° C. is relatively high enough for an industrial use.

Many different embodiments of the present invention may be constructed without departing from the spirit and scope of the present invention. It should be understood that the present invention is not limited to the specific embodiments described in this specification. To the contrary, the present invention is intended to cover various. Modifications and equivalent arrangement included with the spirit and scope of the claims. The following claims are to be accorded the broadest interpretation, so as to encompass all such modification and equivalent structures and functions.

I claim:

1. An apparatus for heat accumulation from a refrigeration machine comprising a first section apparatus for heat accumulation from the refrigeration machine connected to a second section apparatus for heat accumulation from a refrigeration machine connected in series, in which:

a) the first section apparatus for heat accumulation from a refrigeration machine comprises:
      a preliminary heat accumulation tube which is smaller in diameter and inserted inside a first refrigerant tube of the condenser of the refrigeration machine such that both its ends emerge outside said first refrigerant tube of the condenser at the regions where the first refrigerant tube enters and leaves said condenser;
      a feeding tube for the preliminary heat accumulation tube which at one end is connected to one end of said preliminary heat accumulation tube emerging from said region in which said first refrigerant tube leaves said condenser and at another end is used as an inlet to feed lower temperature heat carrying fluid used to accumulate heat, into said preliminary heat accumulation tube;
      a discharge tube for the preliminary heat accumulation tube which at one end is connected to one end of said preliminary heat accumulation tube emerging from said region in which said first refrigerant tube enters into said condenser and at another end is used as an outlet to discharge higher temperature heat carrying fluid used to accumulate heat out of said preliminary heat accumulation tube; and
      an inlet and an outlet for said first refrigerant tube of said condenser;

b) the second section apparatus for heat accumulation from a refrigeration machine comprises:
      a second refrigerant tube a part of which is increased in its cross sectional area and/or increased in its total internal and external wall surfaces relative the remainder of the tube;
      a primary heat accumulation tube which is constructed to enclose said part of said second refrigerant tube which is increased in its cross sectional area and/or increased in its total internal and external wall surfaces relative the remainder of the tube, and constructed to have a space between its internal wall surface and the external wall surface of said part of said second refrigerant tube which is increased in its cross sectional area and/or increased in its total internal and external wall surfaces, and also constructed to have an inlet and an outlet for said space;
      a feed tube for said primary heat accumulation tube which at one end is connected to said inlet for said space of said heat accumulation tube and at another end is used as an inlet to feed lower temperature heat carrying fluid used to accumulate heat into said space of said primary heat accumulation tube;
      a discharge tube for the primary heat accumulation tube which at one end is connected to said outlet for said space of said primary heat accumulation tube and at another end is used as an outlet to discharge higher temperature heat carrying fluid used to accumulate heat out of the said space of said primary heat accumulation tube; and
      an inlet and an outlet for said second refrigerant tube;

c) the connection is made by connecting said discharge tube for the preliminary heat accumulation tube to said feeding tube for the primary heat accumulation tube and by connecting the outlet for said second refrigerant tube to the inlet for said first refrigerant tube of said condenser.

2. A method for modifying a heat accumulation system in a refrigeration machine comprising the steps of replacing the condenser of the refrigeration machine by an apparatus for heat accumulation from a refrigeration machine according to claim 1; connecting the inlet for said second refrigerant tube to the outlet of the compressor of said refrigeration machine; and connecting the outlet for said first refrigerant tube of said condensor to the inlet of the evaporator of said refrigeration machine.

3. A method for modifying a heat accumulation system in a refrigeration machine according to claim 2 in which the refrigeration machine is a refrigerator.

4. A method for modifying a heat accumulation system in a refrigeration machine according to claims 2 or 3 in which the heat carrying fluid is water.

\* \* \* \* \*